United States Patent [19]
Owada et al.

[11] Patent Number: 5,528,307
[45] Date of Patent: Jun. 18, 1996

[54] CLOCK GENERATOR

[75] Inventors: Mitsuru Owada; Shinichi Yamashita, both of Yokohama; Makoto Gohda, Tokyo, all of Japan

[73] Assignee: Canon Kabushiki Kaisha, Tokyo, Japan

[21] Appl. No.: 395,296

[22] Filed: Feb. 27, 1995

Related U.S. Application Data

[63] Continuation of Ser. No. 914,113, Jul. 15, 1992, abandoned.

[30] Foreign Application Priority Data

Jul. 18, 1991 [JP] Japan .................................. 3-203810
Jul. 18, 1991 [JP] Japan .................................. 3-203811

[51] Int. Cl.⁶ ..................................................... H04N 5/95
[52] U.S. Cl. .......................... 348/497; 348/537; 348/542; 358/337
[58] Field of Search .................................. 358/320, 337, 358/339, 312, 148, 149, 158, 159, 160, 19, 17; 360/9.1, 10.1, 36.1, 36.2; 348/497, 536, 537, 538, 539, 540, 542, 543, 544, 545, 546; H04N 5/04, 5/00, 5/12, 5/94, 5/95, 9/88, 9/89

[56] References Cited

U.S. PATENT DOCUMENTS 4,092,672  5/1978  Aschwanden ........................ 358/149
4,692,914  9/1987  Yasumura et al. ..................... 369/49
4,815,061  3/1989  Yasumura et al. ..................... 369/48

FOREIGN PATENT DOCUMENTS 0139478  6/1987  Japan ............................. H04N 5/12
0174083  7/1989  Japan ............................. H04N 5/95
0076383  3/1990  Japan ............................. H04N 5/95
0119881  5/1991  Japan ............................. H04N 5/95

Primary Examiner—David E. Harvey
Attorney, Agent, or Firm—Robin, Blecker, Daley & Driscoll

[57] ABSTRACT

An apparatus for correcting a time base of a video signal generates a clock which is phase-synchronized with a sync. signal of the video signal and has the same frequency. In a special reproducing mode, the apparatus switches an output level of a phase comparator, which phase-compares the sync. signal and the clock to a predetermined level, which is applied to a controlled oscillator and resets a frequency divider which frequency-divides the output of the controlled oscillator, in accordance with the sync. signal to produce the video signal which can be visually recognized even in the special reproducing mode. The apparatus samples and holds the output level of the phase comparator when the video signal drops out and resets the frequency divider which produces the clock by frequency-dividing the output of the controlled oscillator, when the dropout is recovered so that a video signal of high quality is produced immediately after the recovery of the dropout of the video signal.

21 Claims, 4 Drawing Sheets

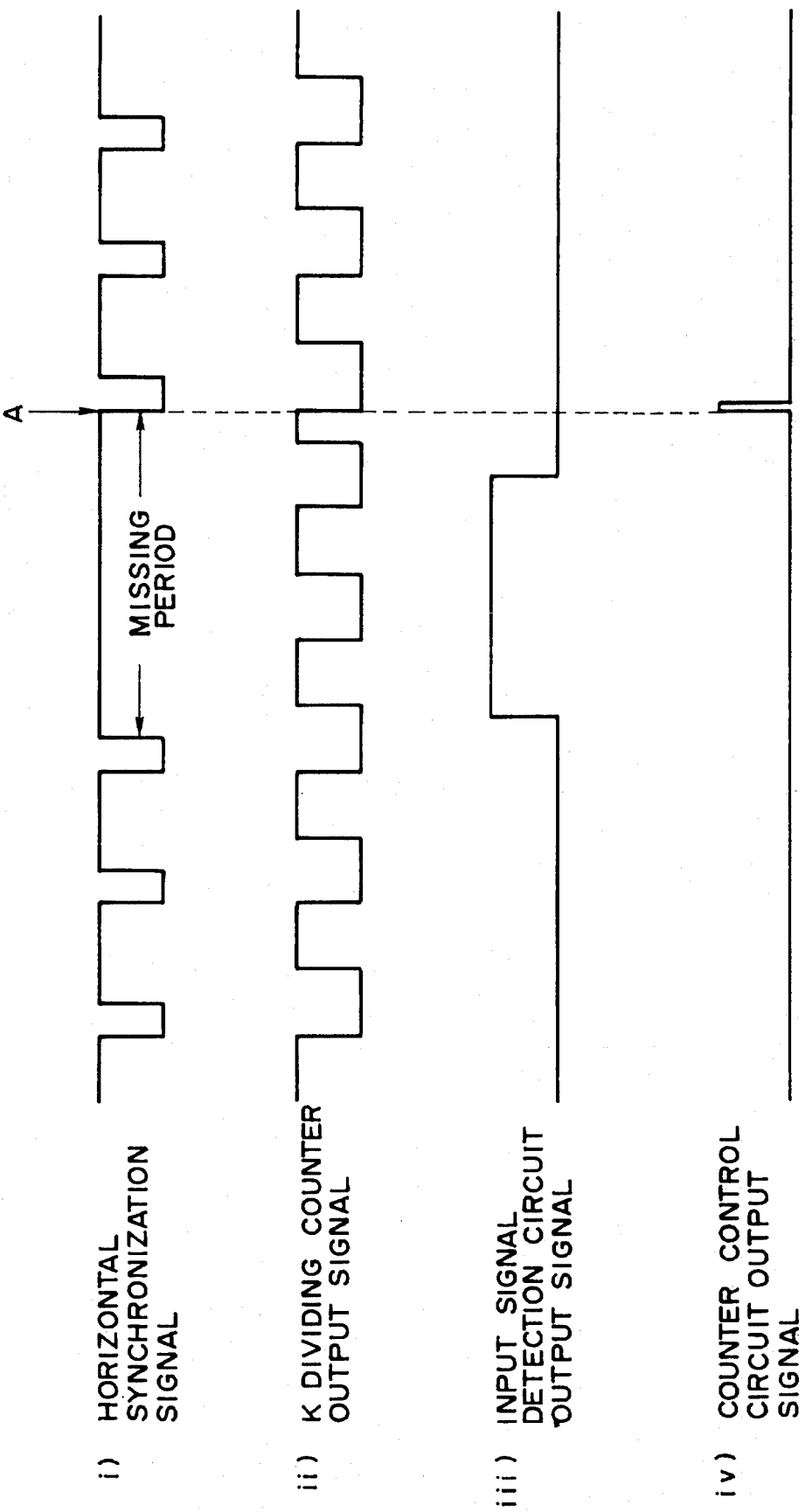

CLOCK GENERATOR

This is a continuation application under 37 CFR 1.62 of prior application Ser. No. 07/914,113, filed Jul. 15, 1992 (now abandoned).

BACKGROUND OF THE INVENTION

1. Field of the Invention

The present invention relates to a time base correction circuit, and more particularly to a clock generator thereof.

2. Related Background Art

A time base correction (TBC) circuit has been known in the art.

It generates a clock which follows a jitter included in an input video signal by a clock generator, samples the input video signal by the clock, writes the resulting digitized data to a memory, reads the data by a stabilized clock and converts it to an analog signal to produce a jitter-free input video signal.

A configuration of a conventional time base correction circuit is shown in FIG. 1.

In FIG. 1, numeral 1 denotes an input terminal. When a video signal including a jitter is applied from the input terminal 1 to a sync. signal separator 2, a horizontal sync. signal, a vertical sync. signal and a burst signal included in the video signal are separated by a sync. signal separator, and the horizontal sync. signal Hsync is applied to a phase sync. circuit (phase locked loop PLL) 3, the vertical sync. signal Vsync is applied to a write address generator 4, and the burst signal Bu is applied to a first phase comparator 5.

The phase sync. circuit 3 comprises a second phase comparator 6 for comparing phases of a feedback clock to be described later and the horizontal sync. signal, a loop filter 7 for determining a response rate, a voltage controlled oscillator (VCO) 8 having an oscillator frequency thereof controlled in accordance with the output of the second phase comparator 6 and a 1/N frequency dividing counter (write address generator) 9, and it generates a clock having M times as high frequency as that of the burst signal, which is phase-locked to the horizontal sync. signal.

A phase difference (in one period ±180° of the burst signal) between the clock generated by the phase sync. circuit 3 and 1/M frequency divided by a 1/M frequency dividing counter 10 and the burst signal is detected by the first phase comparator 5 and a phase shifter 11 shifts the phase thereof in accordance with the phase difference and the clock frequency to match the phase with that of the burst signal, so that the phase shifter 11 produces the clock having M times as high as that of the burst signal which is required for the A/D conversion. In this manner, the clock which follows the jitter included in the video signal is produced.

The count in the 1/N frequency dividing counter 9 indicates an address in one horizontal sync. period of the data derived by sampling the input video signal by the A/D converter 12, and the content thereof is sent to the write address generator 4. The write address generator 4 generates an address to write into the memory 13 based on the vertical sync. signal produced by the sync. signal separation circuit 2 and the signal from the 1/N frequency dividing counter 9.

The output data of the A/D converter 12 is written at the above address in synchronism with the clock from the phase shifter 11 so that data corresponding to the time base is written into the memory 13 and the data written in the memory 13 is read by a stabilized clock (not shown). This data is sent to an output terminal 14 and it is converted to an analog signal by a D/A converter (not shown) to produce a jitter free video signal.

In the prior art time base correction circuit, however, when a time-compressed or time-expanded video signal is applied by fast feed or rewind operation of a video tape recorder (VTR), a normal image can be reproduced within a phase lock range of the phase sync. circuit 3, but beyond the lock range the image is so disturbed that the content thereof cannot be recognized.

Further, in the prior art time base correction circuit, when the video signal input is interrupted by some reason (for example, dropout generated in the reproduction by a VTR or laser disk), the sync. signal separation circuit 2 cannot produce the sync. signal and the phase sync. circuit 3 which is to generate the clock having the same frequency as that of the signal phase-locked to the horizontal sync. signal is disturbed.

In the recovery of the video signal input, the count of the 1/N frequency dividing counter 9 is disturbed and the phase sync. circuit 3 takes a long time to lock the phase.

As result, when the input video signal is interrupted and recovered, the clock signal output is unstable and the image is significantly disturbed.

SUMMARY OF THE INVENTION

It is an object of the present invention to provide a time base correction circuit which solves the above problems.

It is another object of the present invention to provide a time base correction circuit which produces a visually recognizable video signal even when a video signal beyond a lock range of a phase sync. circuit is applied.

In order to achieve the above objects, in accordance with one aspect of the present invention, there is provided an apparatus for correcting a time base of a video signal reproduced from a recording medium, comprising:

(a) a separation circuit for separating a sync. signal in the video signal;

(b) a phase sync. circuit for phase-synchronizing with the sync. signal and generating a first clock having the same frequency;

said phase sync. circuit including a phase comparator for phase-comparing the sync. signal and the first clock, a switching circuit for selectively outputting the output level of said phase comparator or a predetermined level, a controlled oscillator for generating a second clock having an oscillation frequency thereof controlled in accordance with the output of said switching circuit and a frequency divider for frequency-dividing the second clock to generate the first clock;

(c) a control circuit for resetting said frequency divider in accordance with the sync. signal when the video signal is reproduced at a different speed than that in a record mode and causing said switching circuit to output the predetermined level; and (d) a correction circuit for correcting a time base of the video signal by using the second clock.

It is a further object of the present invention to provide a time axis correction circuit which can output an image of high quality before and after temporary dropout of an input video signal.

In order to achieve the above object, in accordance with another aspect of the present invention, there is provided an apparatus for correcting a time base of a video signal comprising:

(a) a separation circuit for separating a sync. signal in the video signal;

(b) a phase sync. circuit for phase-synchronizing the sync. signal and generating a first clock signal having the same frequency;

said phase sync. circuit including a phase comparator for phase-comparing the sync. signal and the first clock, a sample and hold circuit for sampling and holding the output level of said phase comparator, a controlled oscillator for generating a second clock having an oscillation frequency thereof controlled in accordance with the output of said sample and hold circuit and a frequency divider for frequency-dividing the second clock to generate the first clock;

(c) a detector for detecting dropout of the video signal;

(d) a control circuit for controlling said sample and hold circuit in accordance with the output of said detector during the dropout of the video signal and resetting said frequency divider in accordance with the sync. signal immediately after the recovery of the dropout of the video signal; and (e) a correction circuit for correcting a time base of the video signal by using the second clock.

Other objects and features of the present invention will be apparent from the following detailed description of the preferred embodiments taken in conjunction with the accompanying drawings.

BRIEF DESCRIPTION OF THE DRAWINGS

FIG. 4 shows a timing chart of an operation of the circuit shown in FIG. 3.

DETAILED DESCRIPTION OF THE PREFERRED EMBODIMENTS

One embodiment of the present invention is now explained with reference to FIG. 2.

Figure 1:
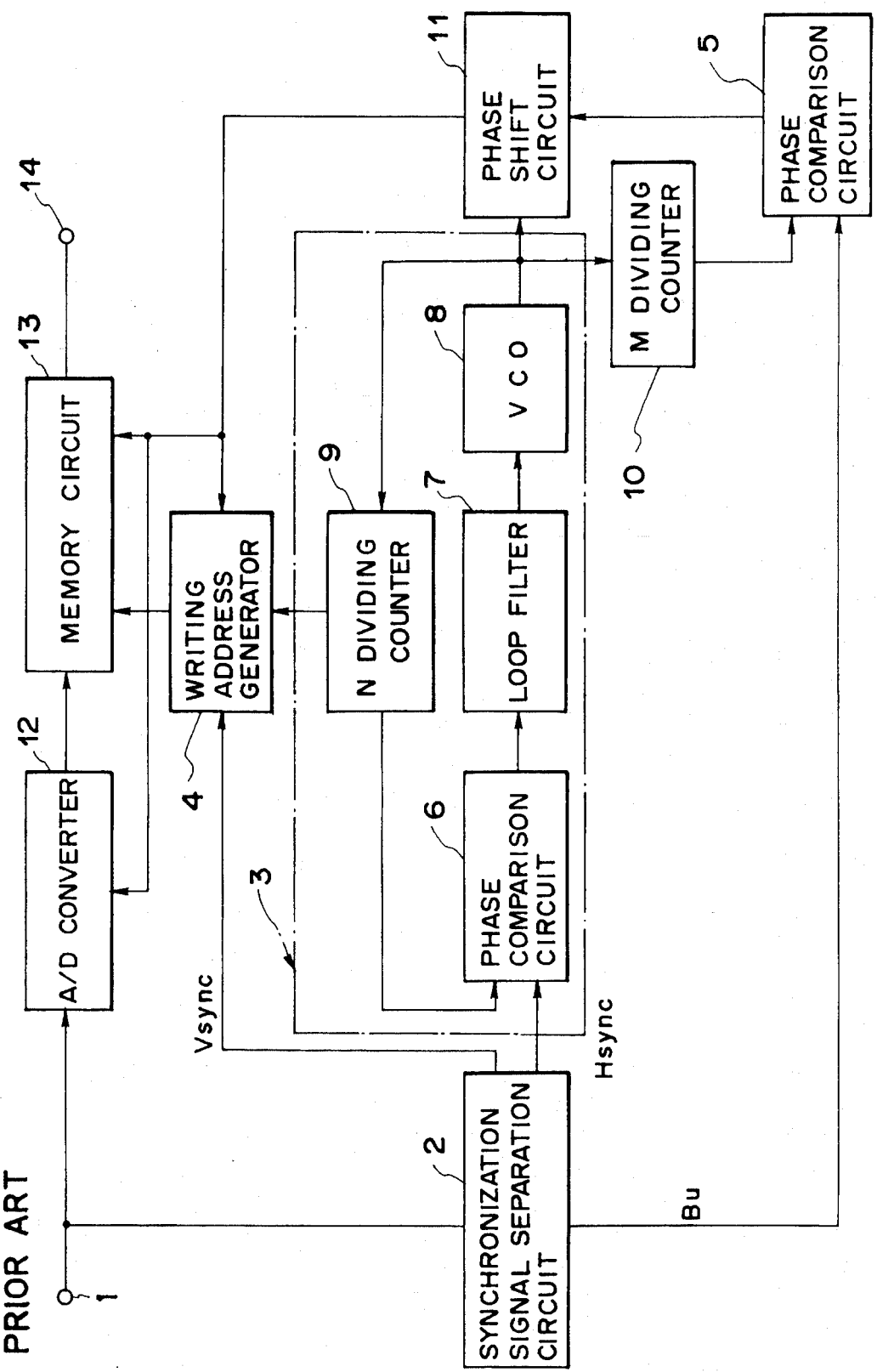
FIG. 1 shows a block diagram of a general configuration of a prior art time base correction circuit.

In the present embodiment, the like components to those of the prior art time base correction circuit shown in FIG. 1 are designated by like numerals.

Figure 2:
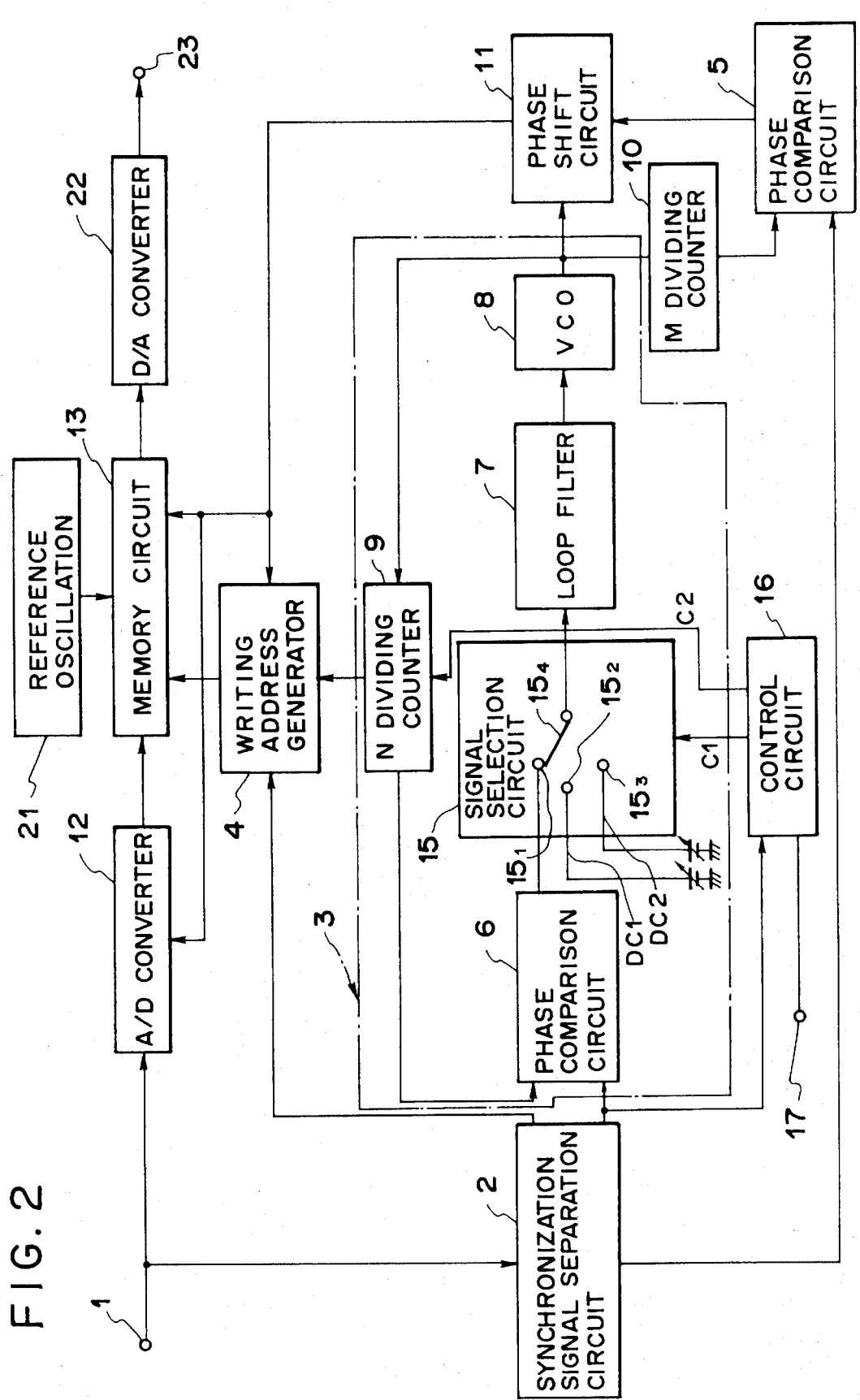
FIG. 2 shows a configuration of one embodiment of a time base correction circuit of the present invention.

FIG. 2 shows a block diagram of a configuration of the time base correction circuit of the present invention. In the present time base correction circuit, a switching circuit (signal selection circuit) 15 which is holding means and a control circuit 16 which is setting means are added to the prior art time base correction circuit shown in FIG. 1.

The switching circuit 15 is inserted between the second phase comparator 6 and the loop filter 7 of the phase sync. circuit 3. An error signal from the second phase comparator 6 is applied to the loop filter 7 through the switching circuit 15.

The switching circuit 15 comprises first, second and third stationary contacts $15_1$, $15_2$ and $15_3$ and a movable contact $15_4$. The first stationary contact $15_1$ is connected to the output line of the second phase comparator 6, the second and third stationary contacts $15_2$ and $15_3$ are connected to the output lines of voltages $DC_1$ and $DC_2$ of the oscillator 8 for setting upper and lower limits of the oscillation frequency, respectively, and the movable contact $15_4$ is connected to the input line of the loop filter 7.

The movable contact $15_4$ is selectively connected to the first to third stationary contacts $15_1$–$15_3$ to select the output signal.

The control circuit 16 is connected to the horizontal sync. signal output line of the sync. signal separation circuit 2, the control signal input line of the switching circuit 15 and the control signal input line of the 1/N frequency dividing counter 9. When the reproduced horizontal sync. signal frequency is out of the range to synchronize the output of the oscillator 8 with the 1/N frequency divided clock by the fast feed or rewind operation of the VTR, the control circuit 16 receives at the input terminal 17 the operation mode information signal such as fast feed or rewind so that it produce a control signal $C_1$ to switch the output of the switching circuit 15 to the voltage $DC_1$ or $DC_2$ and also produces a control signal $C_2$ for setting the count of the 1/N frequency dividing counter 9 to a predetermined count each time the horizontal sync. signal is applied, based on the horizontal sync. signal supplied from the sync. signal separation circuit 2.

An operation of the time base correction circuit of the above configuration is described below.

When the phase sync. circuit 3 operates to lock the phase, the error signal from the second phase comparator 6 is applied to the loop filter 7 through the first stationary contact $15_1$ and the movable contact $15_4$ of the switching circuit 15.

When the frequency is beyond the control of the phase sync. circuit 3 by the fast feed or rewind operation of the VTR, the fast feed or rewind operation mode information is applied to the input terminal 17 of the control circuit 16.

Thus, the control circuit 16 supplies the control signal $C_1$ to the switching circuit 15 so that the movable contact $15_4$ is connected to one of the second and third stationary contacts $15_2$ and $15_3$ and the voltage $DC_1$ or $DC_2$ is supplied to the oscillator 8 through the loop filter 7. In this manner, the oscillator 8 oscillates at the constant frequency.

Where the input video signal from the input terminal 1 is time-compressed, the switching circuit 15 is controlled to select the voltage to increase the oscillation frequency of the oscillator 8, and where the input video signal is time-expanded, the switching circuit 15 is controlled to select the voltage to reduce the oscillation frequency.

Since the 1/N frequency dividing counter 9 normally carries out the ring counter operation synchronized with the horizontal sync. signal during the phase lock of the phase sync. circuit 3, the count thereof is sent to the write address generator 4 which generates the write address to the memory 13, in a timed relation.

Thus, the count of the 1/N frequency dividing counter 9 indicates the address of the sampling data in one horizontal sync. period.

When the video signal which is out of the phase lock range is applied to the input terminal 1, the number of sampling data in one horizontal sync. period varies. Thus, if the count of the 1/N frequency dividing counter 9 is sent to the write address generator 4 as it is, the data is written into the memory 13 in the next horizontal sync. period with forward or backward shift corresponding to the number of sampling data changed.

As a result, the video signal read from the memory 13 has the phase thereof shifted for each horizontal line, and a disturbed image is displayed on a monitor.

In the present embodiment, when the frequency is out of the phase lock range, that is, when the movable contact $15_4$ of the switch 15 is connected to one of the contacts $15_2$ and $15_3$, the count of the 1/N frequency dividing counter 9 is set or reset to the predetermined count by the control circuit 16 for each input horizontal sync. signal so that the relative position of the data to the horizontal sync. signal is maintained in the memory 13 while the number of data in one horizontal sync. period changes.

Accordingly, the data is read from the memory 13 by the clock signal of the stabilized predetermined frequency supplied from a reference oscillator 21, the video signal outputted through the D/A converter 22 and the output terminal 23 is synchronized with the horizontal sync. period, and it is outputted as a horizontally compressed or expanded image on the monitor.

As a result, the content of the image can be readily recognized.

In the present embodiment, while the switching circuit 15 is inserted between the second phase comparator 6 and the loop filter 7 of the phase sync. circuit 3, it may alternatively be inserted between the loop filter 7 and the oscillator 8.

In accordance with the time base correction circuit of the embodiment of FIG. 2, the content of the image can be recognized even when the video signal is time-compressed or time expanded by the fast feed or rewind operation of the VTR.

Another embodiment of the present invention is now explained with reference to FIGS. 3 and 4.

In the present embodiment, the like components to those of the prior art clock generator shown in FIG. 1 are designated by like numerals.

Figure 3:
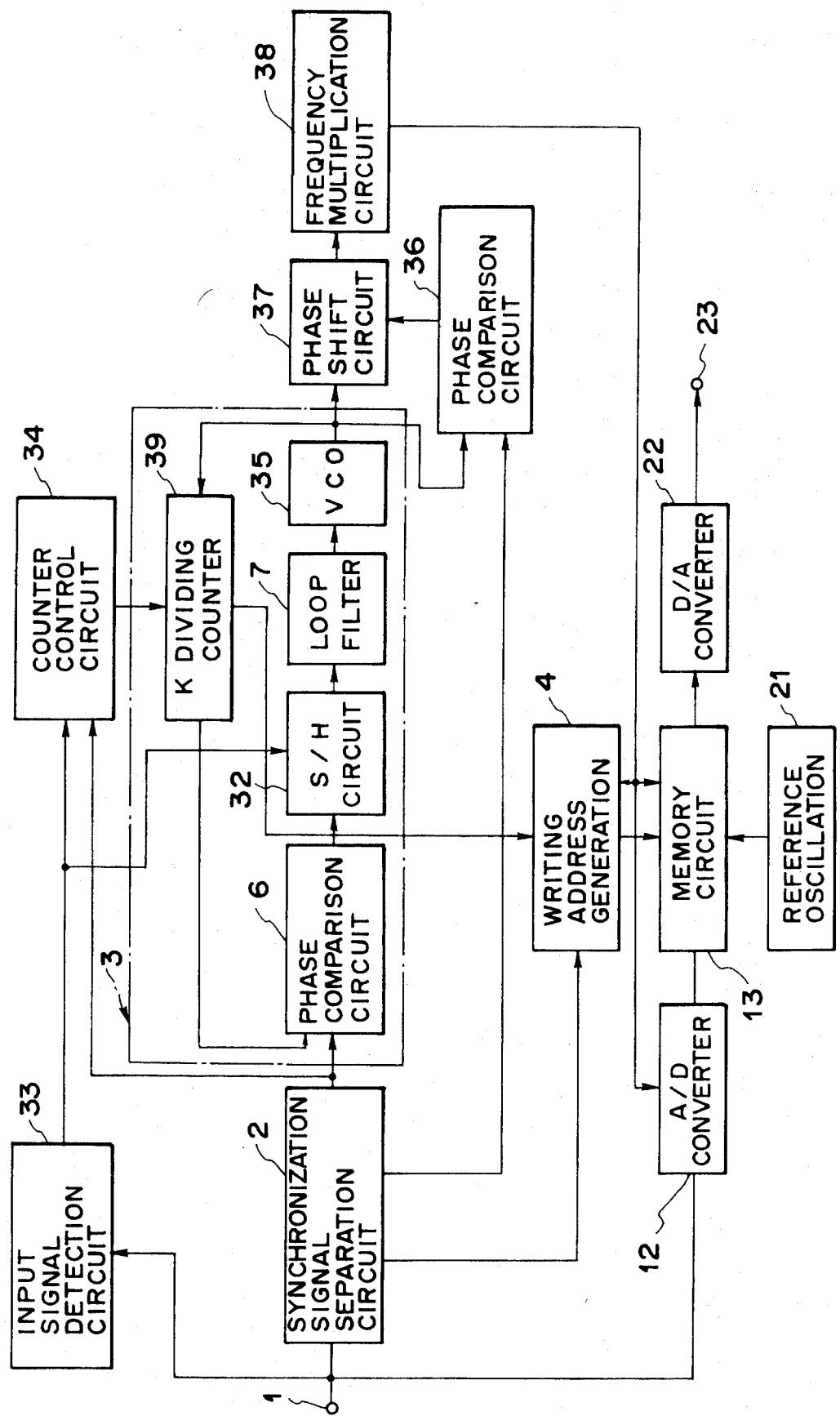
FIG. 3 shows a block diagram of another embodiment of the time base correction circuit of the present invention.

FIG. 3 shows a block diagram of another embodiment of the time base correction circuit of the present invention. In the present embodiment, a sample and hold (S/H) circuit 32 is provided in a succeeding stage to the phase comparator 6 of the prior art time base correction circuit shown in FIG. 1, and an input signal detector 33 and a counter control circuit 34 are further provided as control means.

The sample and hold circuit 32 is inserted between the second phase comparator 6 and the loop filter 7 of the phase sync. circuit 3. The sample and hold circuit 32 is controlled by the output signal from the input signal detector 33 to maintain the output of the second phase comparator 6, that is, the control input to the oscillator 35 at the constant level to stabilize the operation of the oscillator 35. In the present embodiment, a center frequency of the controlled oscillator 35 is the frequency of the burst signal.

The input signal detector 33 is connected to the input terminal 1 and the output line thereof is connected to the sample and hold circuit 32 and the counter control circuit 34. The input signal detector 33 detects the dropout of the horizontal sync. signal included in the video signal applied from the input terminal 1.

The counter control circuit 34 together with the input signal detector 33 form control means for synchronizing the feedback clock with the horizontal sync. signal in synchronism with the operation of the sample and hold circuit 32. The counter control circuit 34 is connected to the horizontal sync. signal output line of the sync. signal separation circuit 2, and the output line of the counter control circuit 34 is connected to a 1/K frequency dividing counter 39.

The counter control circuit 34 produces a signal to control the 1/K frequency dividing counter 39 by the horizontal sync. signal from the sync. signal separation circuit 2 and the detection signal from the input signal detector 33, when the horizontal sync. signal is restored.

An operation of the time base correction circuit of the above configuration is now explained with reference to FIGS. 3 and 4. FIG. 4 shows a timing chart of the output timing of signals in the clock generator of the present embodiment.

When the video signal supplied from the input terminal 1 includes dropout, the horizontal sync. signal included therein has a waveform shown in (i) of FIG. 4. The dropout of the horizontal sync. signal (i) is detected by the input signal detector 33 of FIG. 3 which produces an input signal detector output signal (iii) of FIG. 4.

The sample and hold circuit 32 of FIG. 3 is controlled by the output signal (iii) to maintain the normal operation value of the second phase comparator 6 (normal error before the dropout of the horizontal sync. signal (i)) and stabilize the operation of the oscillator 35 for the dropout of the horizontal sync. signal.

The counter control circuit 34 further produces a counter control circuit output signal (iv) of FIG. 4 when the horizontal sync. signal (i) is restored, to control the output timing of the 1/N frequency divided counter 8 by the horizontal sync. signal (i) and the input signal detector output signal (iii). By the output signal (iv), the 1/K frequency dividing counter output signal (ii) and the horizontal sync. signal (i) of FIG. 4 are maintained at the constant phase when the horizontal sync. signal (i) is restored as shown by a dotted line A in FIG. 4.

Thus, even if the output of the oscillator 35 slightly changes at the dropout in the horizontal sync. signal (i), the output signal (ii) of the 1/K frequency dividing counter 39 follows the variation and the output of the second phase comparator 6 does not abruptly change at the recovery of the horizontal sync. signal (i) and the phase sync. circuit 3 quickly phase-locks to produce the stabilized clock.

The clock having the same frequency as that of the burst signal produced by the voltage controlled oscillator (VCO) 35 is converted to the frequency of the horizontal sync. signal by the 1/K frequency dividing counter 39 and it is fed back to the phase comparator 6. The output clock of the VCO 35 is phase-compared by the phase comparator 36 with the burst signal separated by the phase separation circuit 2, and the phase error output of the circuit 36 is supplied to the phase shifter 37.

The phase shifter 37 shifts the phase of the output clock of the VCO 35 and supplies it to a frequency multiplier 38 in phase synchronism with the burst signal. The frequency multiplier 38 produces a clock having the same frequency as that of the VCO 8 in the embodiment of FIG. 2.

The operations of the write address generator 4, the A/D converter 12, the memory 13, the D/A converter 22 and the reference oscillator 21 are identical to those of the embodiment of FIG. 2.

In the embodiment shown in FIGS. 3 and 4, the dropout of the horizontal sync. signal is detected by the input signal detector 33 based on the video signal supplied from the input terminal 1. When the present invention is applied to the VTR, the dropout may be detected from an RF signal produced by a reproducing head.

In accordance with the time base correction circuit shown in FIGS. 3 and 4, even if the video signal drops out during the reproduction of the VTR, the stable clock signal is generated when the dropout is subsequently restored so that high quality video signal is produced.

What is claimed is:

1. A time base correction apparatus comprising:

(a) input means for inputting a video signal having a vertical sync. signal and other sync. signal;

(b) separating means for separating the other sync. signal from the video signal;

(c) phase-synchronizing means for generating a first clock synchronized with the other sync. signal and having the same frequency as the other sync. signal;

said phase-synchronizing means including phase-comparing means for comparing phases of the other sync. signal and the first clock and oscillating means having an oscillation frequency thereof controlled in accordance with an output of said phase-comparing means, said first clock being generated by using a second clock generated by said oscillating means;

(d) first control means for maintaining a control input to said oscillating means at a constant level according to a dropout of the video signal;

(e) second control means for synchronizing the first clock to the other sync. signal after the recovery of the dropout of the video signal, said first and second control means operating to regulate said phase-synchronizing means irrespective of the vertical sync. signal; and (f) correcting means for correcting a time base of the video signal by using the second clock.

2. A time base correction apparatus according to claim 1, wherein said separating means separates a horizontal sync. signal in the video signal and the first clock has the same frequency as that of the horizontal sync. signal of the video signal.

3. A time base correction apparatus according to claim 1, wherein said phase-synchronizing means includes frequency-dividing means for frequency-dividing the second clock to generate the first clock, and said second control means resets said frequency-dividing means by the separated sync. signal in accordance with the operation of said first control means.

4. A time base correction apparatus according to claim 1, wherein said correcting means includes an AD converter for converting the video signal to a digital signal by using a variable frequency clock generated by using the second clock, and a memory for storing the output of said AD converter in accordance with the variable frequency clock and reading it out in accordance with a clock of a predetermined frequency.

5. A time base correction apparatus according to claim 4, wherein said correcting means includes a frequency multiplier for frequency-multiplying the second clock to generate the variable frequency clock.

6. A time base correction apparatus according to claim 4, wherein said video signal includes a burst signal having a higher frequency than that of the other sync. signal, and said correcting means includes phase shifting means for shifting a phase of the second clock in accordance with a phase difference between the burst signal and the second clock.

7. A time base correction apparatus according to claim 1, wherein said first control means includes sample and hold means for sampling and holding the output of said phase-comparing means.

8. A time base correction apparatus according to claim 7, wherein said first control means includes detecting means for detecting a dropout of the video signal, and said sample and hold means operates in accordance with an output of said detecting means.

9. A clock generator for generating a clock phase-synchronized with a sync. signal in a video signal, comprising:

(a) phase comparison means for phase-comparing the clock having the same frequency as the sync. signal and the sync. signal;

(b) controlled oscillation means having an oscillation frequency thereof controlled in accordance with the output of said phase comparison means, said clock being generated by using an output of said controlled oscillation means;

(c) first control means for maintaining a control input to said controlled oscillation means at a predetermined level according to a reproducing speed of the video signal; and (d) second control means for synchronizing the clock with the sync. signal during the operation of said first control means.

10. An apparatus for correcting a time base of a video signal reproduced from a recording medium, comprising:

(a) separating means for separating a sync signal in the video signal;

(b) phase-synchronizing means for generating a first clock synchronized with the separated sync. signal and having the same frequency as the separated sync. signal, said phase-synchronizing means including phase-comparing means for phase-comparing the separated sync. signal and the first clock, selecting means for selectively outputting the output level of said phase-comparing means or a predetermined level, oscillating means for generating a second clock having an oscillation frequency thereof controlled in accordance with the output of said selecting means and frequency-dividing means for frequency-dividing the second clock to generate the first clock;

(c) control means for causing said selecting means to output the predetermined level when the video signal is reproduced at a different speed than that in a record mode, said control means resetting said frequency-dividing means in accordance with the sync. signal separated by said separating means while the video signal is reproduced at the different speed than that in the record mode, said selecting means selecting the predetermined level according to the reproducing speed of the video signal; and (d) correcting means for correcting a time base of the video signal by using the second clock.

11. An apparatus for correcting a time base of a video signal comprising:

(a) input means for inputting a video signal having a vertical sync. signal and other sync. signal;

(b) separating means for separating the other sync. signal from the video signal;

(c) phase-synchronizing means for generating a first clock synchronized with the other sync. signal and having the same frequency as the other sync. signal;

said phase-synchronizing means including phase-comparing means for phase-comparing the other sync. signal and the first clock, sampling and holding means for sampling and holding an output level of said phase-comparing means;

oscillating means for generating a second clock having an oscillation frequency thereof controlled in accordance witch an output of said sampling and holding means and frequency-dividing means for frequency-dividing the second clock to generate the first clock;

(d) detecting means for detecting a dropout of the video signal;

(e) control means for controlling said sampling and holding means in accordance with an output of said detecting means during the dropout of the video signal and resetting said frequency-dividing means in accordance with the other sync. signal, the controlling operation of said sampling and holding means and the resetting operation of said frequency-dividing means by said control means operating to regulate said phase-synchronizing means irrespective of the vertical sync. signal; and (f) correcting means for correcting a time base of the video signal by using the second clock.

12. A clock generator according to claim 9, further comprising:

frequency-dividing means for frequency-dividing the output of said controlled oscillation means to generate the clock, said second control means synchronizing the clock with the sync. signal by resetting said frequency-dividing means in accordance with the sync. signal.

13. An apparatus according to claim 11, wherein said detecting means detects the dropout of the video signal by detecting a dropout of a horizontal synchronization signal included in the video signal.

14. An apparatus according to claim 11, further comprising reproduction means for reproducing the video signal from a recording medium, and wherein said detecting means detects the dropout of the video signal according to a RF signal corresponding to the video signal reproduced by said reproduction means.

15. A clock signal generating device, comprising:

(a) input means for inputting a video signal having a vertical sync. signal and other sync. signal;

(b) generating means for generating a clock signal phase-synchronized with the other sync. signal, said generating means including phase detection means for detecting phase difference between said clock signal and the other sync. signal and controlled oscillation means having an oscillation frequency thereof controlled in accordance with the output of said phase detection means, said clock being generated by using an output of said controlled oscillation means;

(c) first control means for maintaining a control input to said oscillating means at a constant level according to a dropout of the video signal; and (d) second control means for synchronizing the clock signal to the other sync. signal, said first and second control means operating to regulate said generating means irrespective of the vertical synchronization signal.

16. A device according to claim 15, further comprising means for detecting a dropout of the video signal.

17. A device according to claim 15, wherein said first control means includes holding means for holding an output of said phase detection means, and wherein the oscillation frequency of said controlled oscillation means is controlled according to an output of said holding means.

18. A device according to claim 15, further comprising frequency dividing means for frequency dividing an output of said controlled oscillation means, wherein said second control means resets said frequency dividing means according to said input synchronization signal.

19. A clock generator for generating a clock phase-synchronized with a video signal, comprising:

(a) phase detecting means for detecting phase difference between the clock and an input video signal;

(b) controlled oscillation means having an oscillation frequency thereof in accordance with the output of said phase comparison means, said clock being generated by using an output of said controlled oscillation means;

(c) first control means for maintaining a control input to said controlled oscillation means at a predetermined level according to a reproducing speed of the video signal; and (d) second control means for synchronizing the clock with the input video signal during the operation of said first control means.

20. A clock generator according to claim 19, further comprising a memory for storing a video signal and writing means for writing the input video signal into the memory using the clock.

21. A clock generator according to claim 9, wherein the video signal is reproduced from a recording medium, and said second control means synchronizes the clock with the sync. signal when the video signal is reproduced at a different speed than that in a record mode.

* * * * *